(12) United States Patent
McClure

(10) Patent No.: US 7,089,887 B1
(45) Date of Patent: Aug. 15, 2006

(54) WATER WALL FIT UP TOOL

(76) Inventor: Mark W. McClure, 10 Georgian Way, South Charleston, WV (US) 25309

( * ) Notice: Subject to any disclaimer, the term of this patent is extended or adjusted under 35 U.S.C. 154(b) by 0 days.

(21) Appl. No.: 11/171,438

(22) Filed: Jul. 1, 2005

(51) Int. Cl.
*F22B 37/24* (2006.01)
(52) U.S. Cl. .................. 122/493; 122/511; 228/44.5
(58) Field of Classification Search ............... 122/493, 122/510, 511; 228/44.3, 44.5
See application file for complete search history.

(56) References Cited

U.S. PATENT DOCUMENTS

| | | | |
|---|---|---|---|
| 4,493,139 A | 1/1985 | McClure | 29/267 |
| 4,579,272 A | 4/1986 | McClure | 228/49.3 |
| 4,722,468 A | 2/1988 | McClure | 288/49.3 |
| 4,741,371 A | 5/1988 | Lord | 144/269 |
| 4,756,278 A * | 7/1988 | Fournier | 122/51 |
| 4,846,391 A * | 7/1989 | McClure | 228/49.3 |
| 4,936,500 A * | 6/1990 | McClure | 228/44.5 |
| 5,016,694 A | 5/1991 | Wagner | 144/144.5 |
| 5,083,372 A | 1/1992 | Polutnik | 29/890 |
| 6,039,235 A | 3/2000 | Prissadachky | 288/44.5 |

* cited by examiner

*Primary Examiner*—Gregory Wilson
(74) *Attorney, Agent, or Firm*—Jacobson Holman PLLC

(57) ABSTRACT

The water wall fit up tool will fit a wide range of tube panel sizes such as ⅞ inch through 3¼ inch tube sizes. It uses the adjacent tubes to force the tube panel into alignment. One unit can fit up two tubes yet can be used in conjunction with two or more tools. The water wall membrane keeps the tubes rigid and the portion of the tube panel where the membrane has been removed allows for movement.

18 Claims, 3 Drawing Sheets

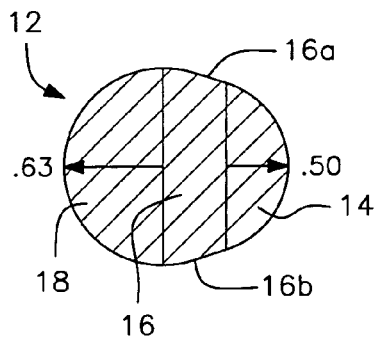
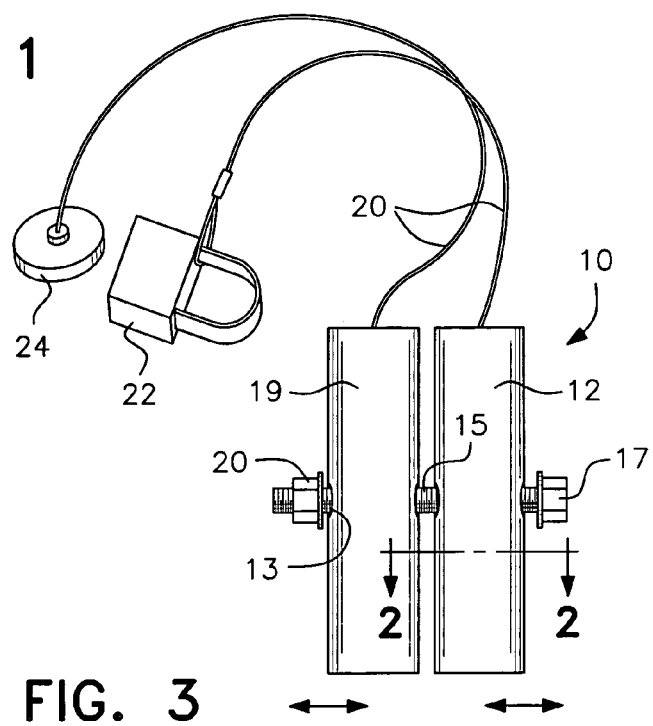
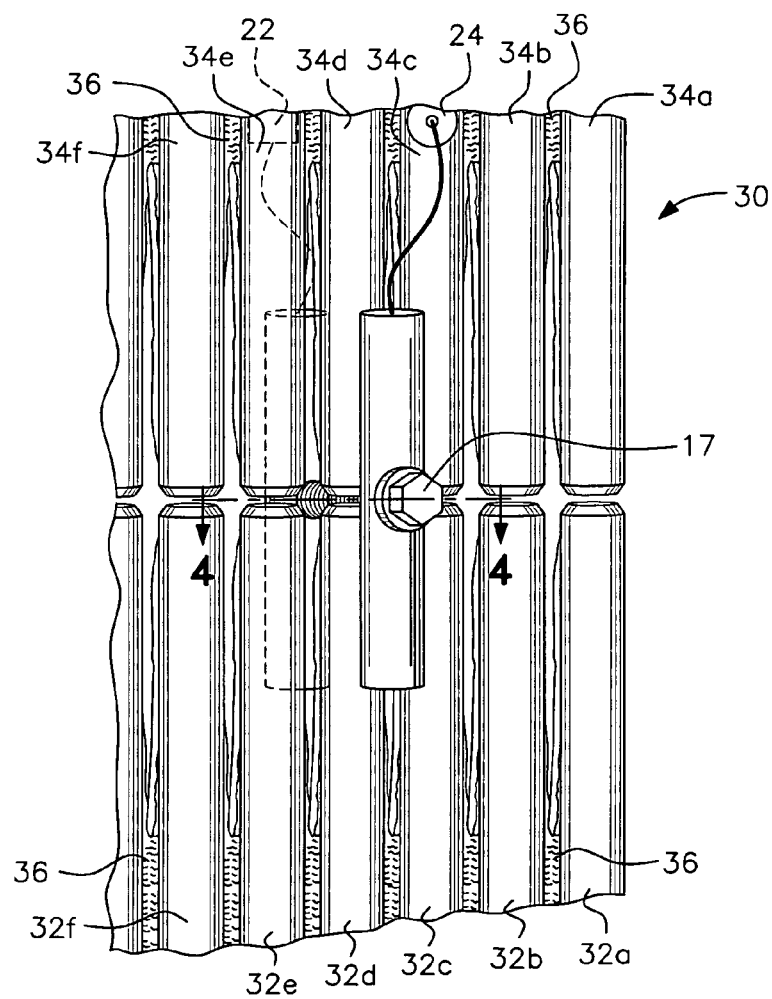

WATER WALL FIT UP TOOL

FIELD OF THE INVENTION

The present invention generally relates to a tool for use in clampingly securing the ends of boiler tubes in aligned relation to enable the ends of the boiler tubes to be joined together by welding. More specifically, this invention relates to a boiler wall tube tool in which boiler tubes in the form of a wall can be clampingly secured to retain adjacent ends of the boiler tubes forming the wall in aligned relation when connecting the ends of the boiler tubes forming the wall when being joined by welding.

BACKGROUND OF THE INVENTION

Tools for clamping and aligning boiler tubes when connecting the ends of the boiler tubes by welding are known as disclosed in prior U.S. Pat. Nos. 4,493,139, 4,579,272 and 4,722,468. The devices disclosed in the above-mentioned patents include structures for securing boiler tube ends in aligned and adjacent relation and function effectively when the boiler tubes are in spaced relation. However, in boiler wall tubes, the boiler tubes are positioned in closely spaced relation and are interconnected by webs to form a continuous boiler tube sheet or wall. The tools disclosed in the above-mentioned patents are not especially adapted for use with boiler tubes forming a boiler wall.

Other patents disclosing tools for use with boiler walls include U.S. Pat. Nos. 4,846,931 and 4,936,500.

SUMMARY OF THE INVENTION

The water wall fit up tool of the present invention will fit a wide range of tube panel sizes such as ⅞ inch through 3¼ inch tube sizes. It uses the adjacent tubes to force the tube panel into alignment. One unit can fit up two tubes yet can be used in conjunction with two or more tools. The water wall membrane keeps the tubes rigid and the portion of the tube panel where the membrane has been removed allows for movement.

An object of the present invention is to provide a boiler wall tube tool for clampingly securing adjacent ends of boiler tubes in aligned and adjacent relation when the ends of the tubes are being connected by welding and the boiler tubes form a tube wall in the boiler.

Another object of the invention is to provide a tool in accordance with the preceding object which includes a pair of opposed bar members made of 410 stainless steel, for example, to clampingly engage a pair of adjacent ends of boiler tubes of possibly differing diameters and tube spacing to retain them in aligned and adjacent relation with each of the opposed bar members including an area providing access to the ends of the boiler tubes for welding.

A further object of the invention is to provide a boiler wall tube tool which includes a pair of clamp members having a bolt passing therethrough for moving the clamp members into clamping engagement with the adjacent ends of boiler tubes.

Still another object of the invention is to provide a tool in accordance with the preceding objects in which each of the clamp members includes different radii on opposite sides of the clamping bars.

Yet another object of the invention is to provide a tool for boiler wall tubes as set forth in the preceding objects which is simple to use, effective for its purposes and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 illustrates the opposed clamping bars of the present invention as interconnected by a through bolt passing through each of the clamping bars and including a tethered magnetic plate for securely anchoring the clamping bars to a water wall so as to prevent the clamping bars from falling.

FIG. 2 is a transverse sectional view taken substantially upon a plane passing along section line 2—2 on FIG. 1 illustrating the structural details of one of the clamping bars.

FIG. 3 is a perspective view of a boiler wall tube assembly with the tool of the present invention installed in operative position thereon.

DETAILED DESCRIPTION OF THE PREFERRED EMBODIMENTS

Figure 4:
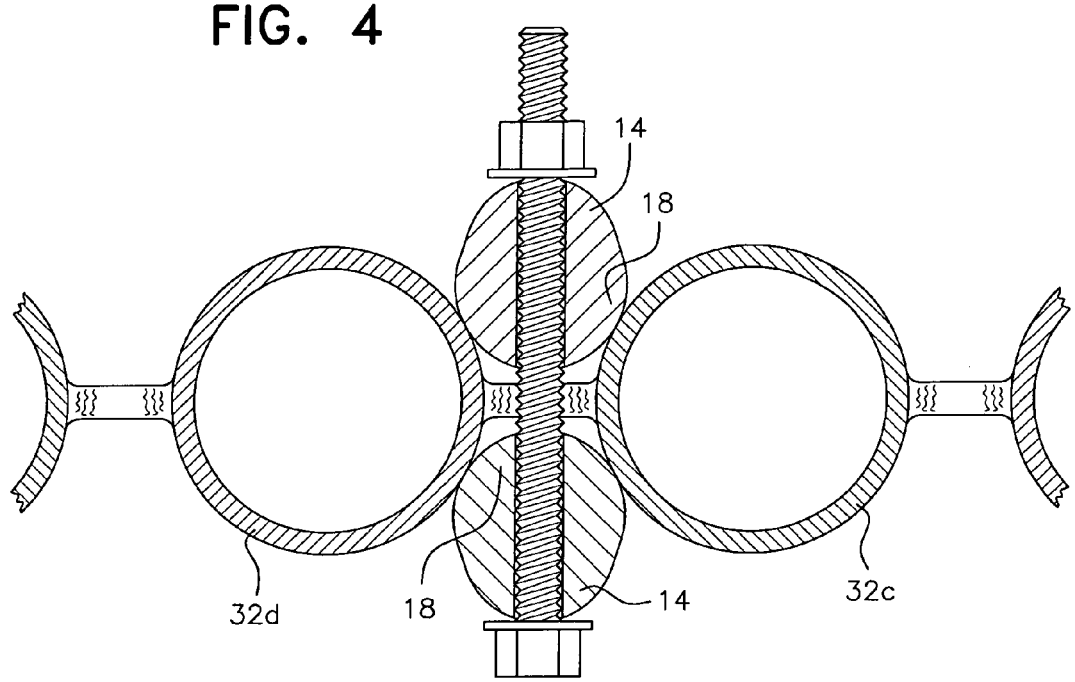
FIG. 4 is a transverse, sectional view taken substantially upon a plane passing along section line 4—4 on FIG. 3 illustrating further structural details of the tool.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1 through 3, in particular, a water wall fit up tool embodying the teachings of the subject invention is generally designated as 10. With reference to its orientation in FIG. 1, the tool includes two clamping bars 12. The bars are of identical construction and are approximately 5 inches long and approximately one inch to 1 ½ inches in width. Extending through a central bore 13 of each bar 12 is a threaded bolt 15 including a tightening head 17 and a removably secured nut 19. Bore 13 is ⅜ to 7/16 of an inch in diameter.

As shown in FIG. 2, the clamping bar 12 includes three portions 14, 16 and 18. Portion 14 is of a semicircular configuration having a radius of 0.5 inches. Portion 18 is of a semicircular configuration having a radius of 0.63 inches.

Interconnecting portion 16, includes straight side walls 16a, 16b to interconnect the semicircular exterior configuration of portions 14 and 16.

Each of the bars 12 includes a cable tether 20 secured at one end to the bar 12 by set screw locking the cable in a groove in the bar at an opposite end to a magnet 22 or 24, for example. It is only necessary that one of the bars 12 include a magnet for securing the tool 10 to a water wall since bars 12 are interconnected by bolt 15. Alternatively, each bar may include a magnet on opposite sides of the water wall. Magnets 22 and 24 are alternative exampels of a magnet configuration which may be used with the present invention. It is understood as being within the scope of the invention that alternate arrangements of a magnet may be used.

In FIG. 3, a water wall panel 30 is shown comprised of a plurality of tubes 32a, 32b, 32c, 3d, 32e . . . in opposed relationship with tubes 34a, 34b, 34c, . . . At a location spaced from the opposed ends of the tubes 32, 34, adjacent tubes are welded together by weld webs 36.

The opposed ends of the tubes 32, 34 are therefore free to move with respect to each other. To correct the misalignment of the ends of the opposed tubes, the tool of the present invention is used to exert side pressure on the ends of the opposed tubes until the ends are in alignment.

This is accomplished by placement of a clamping bar 12 on each side of the water wall panel with a curved portion of at least one of the bars tangentially contacting the tubes of the water panel and curving in a direction opposite to a curvature of the tubes for contacting two tubes therebetween. The bolt 15 is then passed through the opposed clamping bars and tightened to draw the clamping bars towards each other. The two clamping bars can be used as a single set or in conjunction with multiple sets of clamping bars to move the ends of the opposed tubes into alignment for subsequent welding. The passage 13 through each of the bars may be cylindrical, with the diameter of the hole being slightly greater than the diameter of the bolt 15, and due to the absence of threads, allows the clamping bars to shift slightly to accommodate different diameter boiler tubes.

Figure 5:
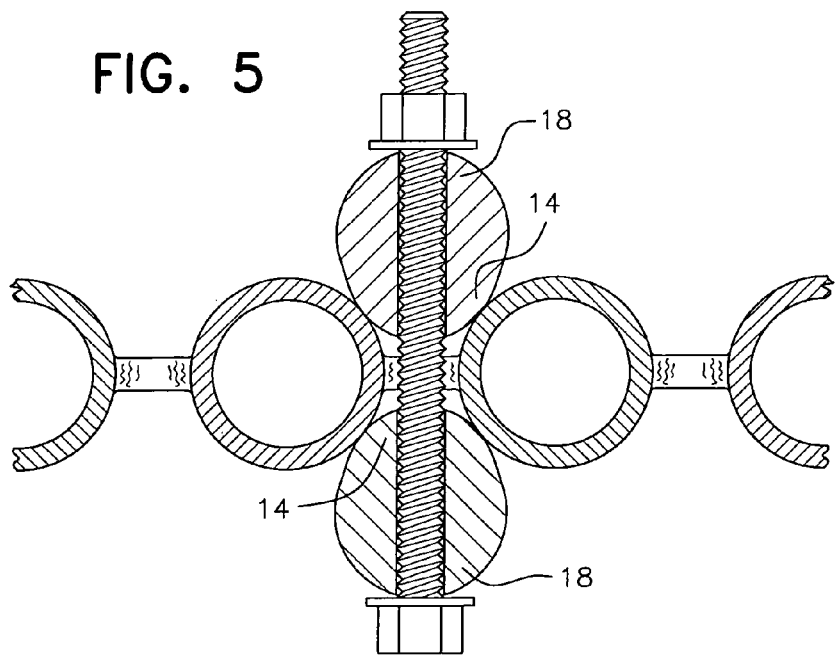
FIG. 5 is a transverse sectional view taken substantially upon a plane passing along section line 4—4 on FIG. 3 illustrating the 180 degree rotation of the two clamping bars as compared to the clamping bars shown in FIG. 4 to illustrate a set of water wall tubes of different separation from that shown in FIG. 4 and the use of a smaller radius side of each of the clamping bars to accommodate a different separation distance of the tubes and to accommodate different tube sizes.

In addition, as shown in FIGS. 4 and 5, depending upon the placement of the clamping bars between the tubes 32c and 32d, for example, whether larger diameter portion 18 or smaller diameter 14 is used to contact the ends of the tubes, different diameter water wall tubes may be accommodated and moved into aligned position for subsequent welding. When portion 14 of the clamping bars engages the tubes, a ⅞ inch through two inch diameter water wall tube may be aligned into position. However when portion 18 of the clamping bars 12 engages the water wall tubes, a 1.75 to 3.25 inch diameter water wall tube end may be moved into alignment.

In an alternate embodiment, clamping bars 40 are configured dependent upon a specific diameter of water panel tubes to be aligned. Larger bars 40 may be used for larger diameter of water wall tubes. In addition, a flat surface 42 is used to seat a bolt head 44 of a bolt 46 as well as provide a seat for a nut 48 as shown in FIG. 8.

Figure 6:
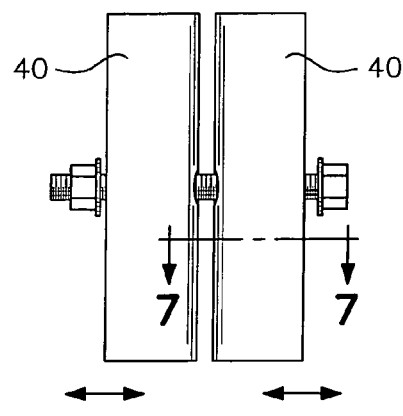
FIG. 6 is a side view of an alternate embodiment of opposed clamping bars.
Figure 7:
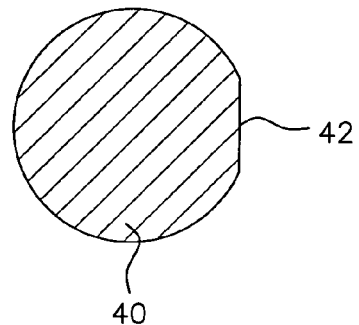
FIG. 7 is a transverse, sectional view taken substantially upon a plane passing along section line 7—7 on FIG. 6 illustrating the structural details of one of the clamping bars of the alternate embodiment.
Figure 8:
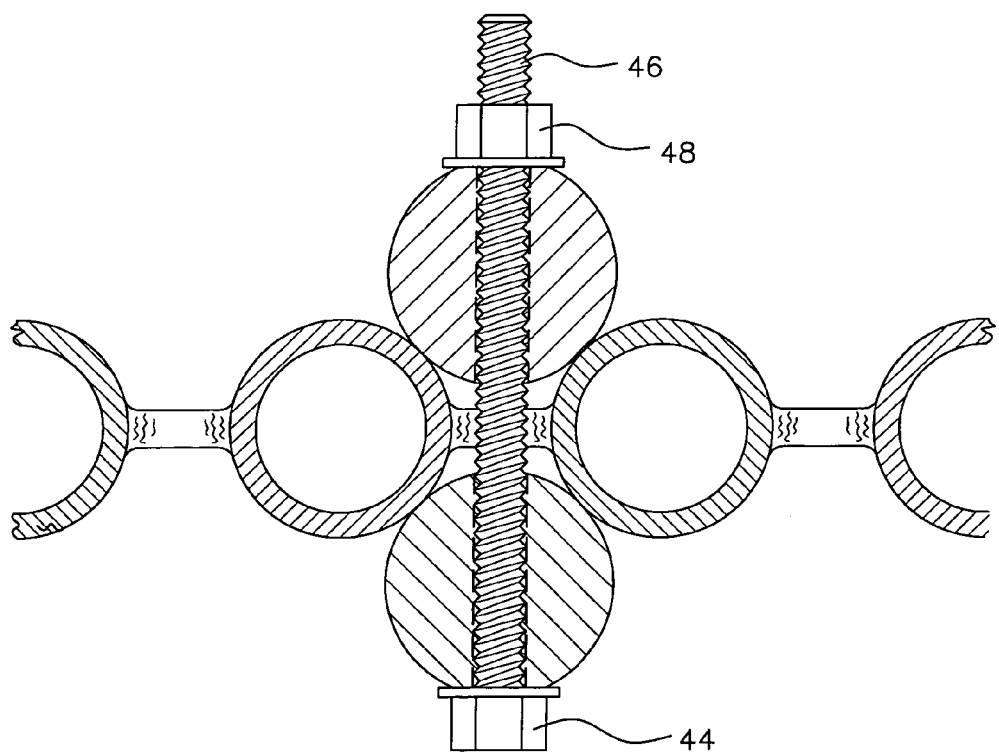
FIG. 8 is a transverse, sectional view similar to the views shown in FIGS. 4 and 5 to illustrate an alternate arrangement of clamping bars for positioning of tube ends.

In the embodiment of FIGS. 6 through 8, the bore hole through the bars 40 is threaded to ensure a secure connection between the clamping bars 40. This may be necessary where severe misalignment of the tube ends is present so as to ensure both vertical alignment and axial alignment of the water wall tube ends. The contact of the clamping bars with the tube ends can pull the tube ends together even if the tube ends are divergent at an angle of up to approximately 45 degrees. Alternatively, the bore hole is cylindrical having a smooth side wall as in FIGS. 4 and 5.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A water fit up tool comprising:
   two bars for fitting on opposite sides of a water wall made up of a plurality of tubes welded between adjacent tubes, at least one of said two bars having a curved portion tangentially contacting the tubes and curving in a direction opposite to a curvature of the tubes for contacting two tubes therebetween, and
   a bolt passing through said two bars for moving the two bars closer together for drawing opposed ends of the tubes into vertical and axial alignment for subsequent welding of the opposed ends.

2. The water wall fit up tool as claimed in claim 1, wherein a hole allows passage of the bolt through the two bars.

3. The water wall fit up tool as claimed in claim 2, wherein the hole is threaded.

4. The water wall fit up tool as claimed in claim 2, wherein the hole is cylindrical.

5. The water wall fit up tool as claimed in claim 1, wherein a side of the two bars includes a flat seat for receipt of one of a bolt head and a nut.

6. A water wall fit up tool comprising:
   two bars for fitting on opposite sides of a water wall made up of a plurality of tubes welded between adjacent tubes, and
   a bolt passing through said two bars for moving the two bars closer together for drawing opposed ends of the tubes into vertical and axial alignment for subsequent welding of the opposed ends,
   at least one of the two bars including three portions, a first one of the three portions having a first radius, a second one of the three portions having a second radius greater than the first radius and a third one of the three portions interconnecting the first portion and the second portion.

7. The water wall fit up tool as claimed in claim 6, wherein the first radius is approximately 0.50 inches.

8. The water wall fit up tool as claimed in claim 7, wherein the second radius is approximately 0.60 inches.

9. A water wall fit up tool comprising:
   two bars for fitting on opposite sides of a water wall made up of a plurality of tubes welded between adjacent tubes, and
   a bolt passing through said two bars for moving the two bars closer together for drawing opposed ends of the tubes into vertical and axial alignment for subsequent welding of the opposed ends,
   at least one of the two bars including a tether connected to a magnet.

10. A water wall assembly comprising:
    a plurality of tubes interconnected by welds, opposed ends of the tubes being spaced from the welds interconnecting the tubes, and
    two bars located on opposite sides of the tubes and bridging a gap between the opposed ends of the tubes for moving the opposed ends into vertical and axial alignment, at least one of said two bars having a curved portion tangentially contacting the tubes and curving in a direction opposite to a curvature of the tubes for contacting two tubes therebetween.

11. The water wall assembly as claimed in claim 10, further comprising a bolt passing through said two bars for moving the two bars closer together.

12. The water wall assembly as claimed in claim 11, wherein the hole is threaded.

13. The water wall assembly as claimed in claim 11, wherein the hole is cylindrical.

14. The water wall assembly as claimed in claim 10, wherein a side of the two bars includes a flat seat for receipt of one of a bolt head and a nut.

15. A water wall assembly comprising:
  a plurality of tubes interconnected by welds, opposed ends of the tubes being spaced from the welds interconnecting the tubes, and
  two bars located on opposite sides of the tubes and bridging a gap between the opposed ends of the tubes for moving the opposed ends into vertical and axial alignment,
  at least one of the two bars including three portions, a first one of the three portions having a first radius, a second one of the three portions having a second radius greater than the first radius and a third one of the three portions interconnecting the first portion and the second portion.

16. The water wall assembly as claimed in claim 15, wherein the first radius is approximately 0.50 inches.

17. The water wall assembly as claimed in claim 16, wherein the second radius is approximately 0.60 inches.

18. A water wall assembly comprising:
  a plurality of tubes interconnected by welds, opposed ends of the tubes being spaced from the welds interconnecting the tubes, and
  two bars located on opposite sides of the tubes and bridging a gap between the opposed ends of the tubes for moving the opposed ends into vertical and axial alignment,
  at least one of the two bars including a tether connected to a magnet.

* * * * *